Dec. 15, 1959     E. F. WAGNER     2,916,763

TORSION BAR HINGE ASSEMBLY

Filed Sept. 26, 1955

INVENTOR.

Edward F. Wagner

BY

Wilson, Redrow & Sadler

United States Patent Office 2,916,763
Patented Dec. 15, 1959

2,916,763

TORSION BAR HINGE ASSEMBLY

Edward F. Wagner, Lakeville, Ind., assignor to Studebaker-Packard Corporation, Detroit, Mich., a corporation of Michigan Application September 26, 1955, Serial No. 536,498

1 Claim. (Cl. 16—180)

This invention relates to hinge constructions and refers more particularly to hinges used for trunk lids or the like on automotive vehicles. More specifically the invention relates to a new and improved torsion bar hinge assembly.

It is a main object of the invention to provide a new and improved torsion bar hinge assembly which comprises a relatively few number of parts, has no parts which require machining, is inexpensive to manufacture and is readily installable.

Another object of the invention is to provide a torsion bar hinge assembly in which the torsion bar thereof operates directly between a fixed support, such as a bracket, and a hinge without any intermediate levers or the like being disposed between the torsion bar and the hinge.

Other objects of the invention will become apparent from the following specification, the drawing relating thereto, and the appended claim.

Figure 1:
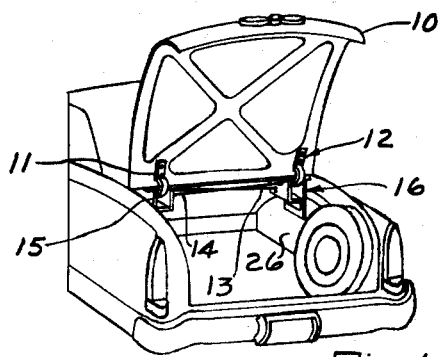
Fig. 1 illustrates the rear end of an automobile with the trunk lid in a raised position to show the installation of a torsion bar hinge assembly constructed in accordance with the present invention.

Referring to the drawing, there is shown in Fig. 1 the rear end of an automobile with the trunk lid 10 thereof in a raised position. The hinge assembly for lid 10 includes hinges 11 and 12 and torsion bars 13 and 14.

Figure 2:
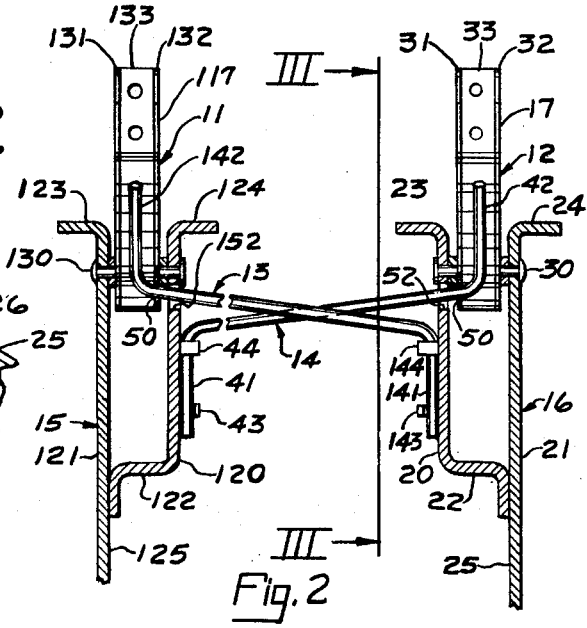
Fig. 2 shows an enlarged sectional view, taken on line II—II of Fig. 3, of the torsion bar hinge assembly shown in Fig. 1.

Fig. 2 shows an enlarged view of the hinge assembly in which two spaced apart brackets 15 and 16, which attach rigidly to the body of the vehicle, function as stationary supports. Brackets 15 and 16 have the same construction. Bracket 16 has parallel sidewalls 20 and 21 and a floor portion 22. Flanges 23 and 24 are provided to facilitate mounting of the bracket to an upper part of the trunk compartment, as by welding. An extension 25 of wall 21 attaches to the wheel housing 26.

Corresponding reference numerals for bracket 15 are the same except that they are increased by 100.

Figure 4:
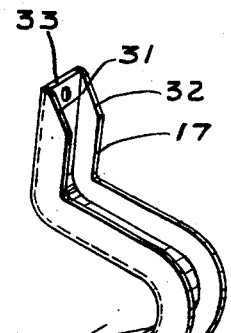
Fig. 4 is a perspective view of the right hand hinge shown in Fig. 2.
Figure 3:
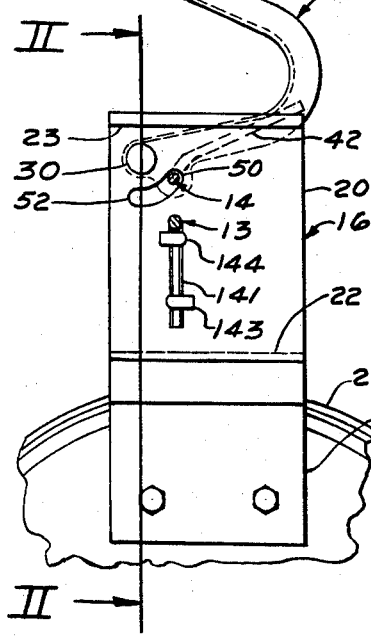
Fig. 3 is a view taken on line III—III of Fig. 2.

Hinge 12 is pivotally mounted in bracket 16 for movement in a vertical plane by means of a pin 30 and suitable washers. Hinge 12 is generally U-shaped with one leg of the U being pivotally connected at the end thereof to bracket 16 and the other leg of the U being provided with a flange portion 17 which is rigidly attachable to lid 10 by suitable fastening means. Hinge 12 has a channel-shaped section, the channel being formed by sidewalls 31 and 32 and a bottom portion 33. Hinge 12 pivots about pin 30 which has a pivot axis 40 as indicated in Fig. 4. Suitable bores for receiving pin 30 are provided in sidewalls 20 and 21 of bracket 16 and sidewalls 31 and 32 of hinge 12.

Associated with hinge 12 is torque member or torsion bar 14 which functions as a spring to store energy when trunk lid 10 is closed and releases such energy to aid the lifting of lid 10 and the holding of lid 10 in a raised position. Torsion bar 14 is in the form of an elongated rod and has crank arms 41 and 42 at opposite ends thereof. Crank arm 41 is attached to a fixed support, illustrated as bracket 15, by means of prongs 43 and 44 which maintain crank arm 41 in a fixed position so that when the crank arm 42 at the other end of bar 14 is turned in a downward direction, a twisting force is applied to the intermediate portion of bar 14. Means may be provided for holding crank arm 41 in any one of a plurality of positions so that the restoring force of torsion bar 14 may be varied.

Crank arm 42 of torsion bar 14 is disposed in engagement with hinge 12 and movement of lid 10 causes arm 42 to move angularly relative to the crank arm 41 at the opposite end of torsion bar 14. Hinge 12 is provided with a bore 50 in sidewall 31 thereof through which the intermediate portion of torsion bar 14 extends. Bore 50 is disposed at a point radially spaced from pivot axis 40 and a lug 51 is provided on sidewall 31 of hinge 12 to accommodate bore 50. Crank arm 42 extends laterally from bar 14 and bears against the bottom portion 33 of hinge 12 between and parallel to the sidewalls 31 and 32 of hinge 12.

An arcuately shaped slot 52 is provided in sidewall 20 of bracket 16 to permit torsion bar 14 to extend through sidewall 20 and to provide clearance for the movement of bar 14 as the lid 10 is raised and lowered.

The angular relationship between crank arms 41 and 42 when torsion bar 14 is in an unstressed condition is arranged so that torsion bar 14 will be twisted about its longitudinal axis when lid 10 is closed. When lid 10 is raised the rod 14 uncoils and aids the lifting of the lid 10 against the force of gravity. Preferably, when the lid 10 is at its fully raised position, rod 14 will still be distorted somewhat from the position it would normally take if either of the crank arms were entirely free to assume an unstressed position.

Hinge 12 and torsion bar 14 operate in parallel with hinge 11 and torsion bar 13 to facilitate the resilient hinging of lid 10. Hinge 11 and torsion bar 13 are constructed and operate in the same manner as hinge 12 and torsion bar 14, which are described above, except that one unit constitutes the left side and the other unit constitutes the right side of the entire assembly. Accordingly the same reference numerals are used for the elements associated with hinge 11 and torsion bar 13 except that they are increased by 100. The left hand side of the assembly will therefore not be described separately.

The invention may be embodied in other specific forms without departing from the spirit or essential characteristics thereof. The embodiment of the invention described and shown is therefore to be considered in all respects as illustrative and not restrictive, the scope of the invention being indicated by the appended claim rather than by the foregoing description, and all changes which come within the meaning and range of equivalency of the claim are therefore intended to be embraced therein.

It is claimed and desired to secure by Letters Patent:

A hinge structure for a closure adapted to swing between open and closed positions comprising first and second spaced apart fixed supports, a generally U-shaped hinge having a channel shaped section with parallel side portions and a bottom portion, said hinge having one leg of the U pivotally connected to said first support for movement about a pivot axis, a torsion rod spring element having one end thereof attached to said second support and having a movable end journaled in said hinge, said hinge having a bore in one of said side portions at a point radially spaced from said pivot axis to receive and journal the movable end of said rod to effect holding of said rod in engagement with said hinge as said hinge is moved about said pivot axis from one extreme to the other in its range of movement, a crank arm attached to the movable end of said rod and extending between said side portions of said hinge and engaging said bottom portion of said hinge to effect twisting of said torsion rod about its longitudinal axis during movement of said hinge about said pivot axis.

References Cited in the file of this patent

UNITED STATES PATENTS

| | | |
|---|---|---|
| 2,235,984 | Devereaux | Mar. 5, 1941 |
| 2,602,957 | Anderson | July 15, 1952 |

FOREIGN PATENTS

| | | |
|---|---|---|
| 696,420 | Great Britain | Sept. 2, 1953 |